United States Patent [19]
Hand et al.

[11] Patent Number: 4,817,347
[45] Date of Patent: Apr. 4, 1989

[54] WINDOW PANEL

[75] Inventors: Derek L. A. Hand, Solihull; Christopher W. G. Hall, Redditch, both of England

[73] Assignee: Pilkington Brothers P.L.C., St. Helens, England

[21] Appl. No.: 921,118

[22] Filed: Oct. 21, 1986

[30] Foreign Application Priority Data

Feb. 27, 1986 [GB] United Kingdom ............... 8604847

[51] Int. Cl.$^4$ ............................................. E06B 7/12
[52] U.S. Cl. ........................................ 52/171; 52/759;
219/203; 219/522; 428/192; 428/412;
428/425.6
[58] Field of Search ............... 428/425.6, 412, 192;
219/203, 219, 522, 548, 213; 52/171, 789

[56] References Cited

U.S. PATENT DOCUMENTS

| 3,388,032 | 6/1968 | Saunders | 428/412 |
| 3,388,034 | 6/1968 | McCombie | 428/412 |
| 4,556,600 | 12/1985 | Kraemling et al. | 428/425.6 |
| 4,645,146 | 2/1987 | Hall | 219/203 |
| 4,683,172 | 7/1987 | LeGrand et al. | 428/425.6 |

Primary Examiner—George F. Lesmes
Assistant Examiner—P. R. Schwartz
Attorney, Agent, or Firm—Burns, Doane, Swecker & Mathis

[57] ABSTRACT

A lightweight impact-resistant window panel, for example for adhesive glazing to the airframe of an unpressurized aircraft, has outer and inner glass plies which are laminated with an intermediate impact-resistant plastics ply. An inner ply of impact-resistant plastics is bonded to the rearward face of the inner glass ply. The aggregate thickness of the impact-resistant plies is in the range from about 1 mm to about 7.5 mm.

15 Claims, 1 Drawing Sheet

WINDOW PANEL

BACKGROUND OF THE INVENTION

This invention relates to a lightweight impact-resistant window panel, for example for adhesive glazing to the airframe of an unpressurised aircraft.

There is a need for bird-impact resistant window panels for use as the front window panels of unpressurised aircraft, particularly helicopters. Suitable lightweight helicopter window panels have been produced by bonding an outer glass ply to an inner ply of impact-resistant plastics, such as stretched acrylic. The outer glass ply is typically 2 mm to 3 mm thick and the inner plastics ply typically about 4 mm thick. The differences in the coefficients of thermal expansion of the glass and impact-resistant plastics plies lead to thermal stresses as the temperature varies, and such stresses tend to cause shape distortion and deformation of the panel. The problems caused by the stresses are most serious in irregularly shaped flat window panels and curved window panels, especially window panels of varying curvature.

It has been usual to bolt the window panels in position in the airframe, so that substantial forces have been available to align the periphery of the window panel with the frame and secure the panel in position. Despite this, it has sometimes been necessary to specify that the window panel should only be fitted within a narrow specified temperature range.

There is now a requirement for lightweight, impact-resistant window panels for unpressurised aircraft which can be secured in position without the need for bolts, for example by adhesive glazing to the airframe, and can be fitted over a wide range of temperatures.

The invention is based on the discovery that by using a more symmetrical cross-section of the laminated window panel in which two plies of glass are used and are laminated with two thin plies of impact-resistant plastics material, one between the two glass plies and the other on the rearward face of the panel, the problem of mismatch of shape over the range of operating temperatures is overcome and the fit to the airframe is achieved over the range of fitting temperatures.

BRIEF SUMMARY OF THE INVENTION

A lightweight impact-resistant window panel of the invention comprises an outer toughened glass ply and an inner glass ply each having a thickness in the range from about 1.5 mm to about 3.5 mm and being laminated with an intermediate ply of impact-resistant plastics material which is adhered to the glass plies by transparent plastics interlayers. An inner ply of impact-resistant plastics material is bonded to the rearward face of the inner glass ply by an interlayer of transparent plastics material. The two plies of impact-resistant plastics material have an aggregate thickness in the range from about 1 mm to about 7.5 mm.

The inner glass ply may be annealed, or chemically or thermally toughened. The outer glass ply is chemically or thermally toughened.

The inner and outer glass plies may be of the same thickness within the range of thickness from about 1.5 mm to about 3.5 mm. It is preferred that the thickness of the inner glass ply differs from the thickness of the outer glass ply by no more than about 1 mm.

Preferably the thickness of the inner and outer glass plies is in the range of nominal glass thickness from about 2 mm to about 3 mm.

In order to provide a strong window panel with good resistance to stone damage, hailstones and handling damage it is preferable to use a thicker outer glass ply, for example a nominal thickness of about 3 mm. To save weight the inner glass ply is usually thinner than the outer glass ply, preferably no more than about 1 mm thinner.

In the preferred constructions the intermediate impact-resistant ply is of polycarbonate. The inner impact-resistant ply may also be of polycarbonate.

The aggregate thickness of the intermediate and inner plies of impact-resistant plastics may be in the range from about 1 mm to about 3 mm, especially from about 1 mm to about 2 mm, although greater thicknesses may be required for higher speed aircraft.

Preferably the transparent plastics interlayers have a thickness in the range 0.375 mm to 2.5 mm, especially 0.375 mm to 1.5 mm.

The interlayer materials used should be compatible with the glass and plastics to which they are bonded. They are preferably of thermoplastic or the thermoset polyurethane.

The inner ply of impact-resistant plastics material, in addition to contributing to the impact performance of the window panel, serves as an anti-spall layer to control spall from the rearward face of the inner glass ply. It may carry a coating of abrasion resistant material, preferably a self-healing polyurethane, on its exposed face.

In order to provide a panel which is dimensionally stable over a very wide range of temperature, it is preferred that the symmetry of the panel should be maintained as far as practical (consistent with a satisfactory anti-spall performance), by using a thin ply of impact-resistant plastics as the inner plastics ply. Thus the inner ply of impact resistant plastics will generally be no thicker than about 2 mm and preferably will not exceed about 1 mm in thickness. It is generally preferred that the bulk of the impact-resistant plastics is present in the intermediate plastics ply, and the intermediate ply will generally be at least as thick as, or thicker than, the inner ply of impact-resistant plastics.

For adhesive glazing of the window panel to a window frame of an airframe structure of an unpressurised aircraft, the window panel may have a peripheral band adhered to the periphery of the rearward face of the panel, which band has an adhesive face for adhesion to a window frame having matching shape.

The peripheral band may comprise a spacer strip of thermosetting polyurethane one face of which is adhered to the rearward face of the window panel, an electrical heating element adhered to the other face of the spacer strip, and an adhesive strip of thermoplastic polyurethane over the heating element for adhesion to the airframe.

BRIEF DESCRIPTION OF THE DRAWINGS

An embodiment of the invention will not be described, by way of example, with reference to the accompanying drawings, in which.

DETAILED DESCRIPTION

Figure 1:
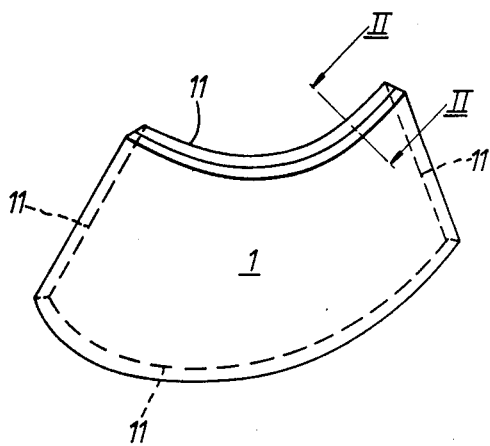
FIG. 1 is a perspective view of a window panel for adhesive glazing to the airframe of a helicopter, this view being from the outside of the window panel when mounted in an airframe.

The curved window panel illustrated in FIG. 1 is one of a matching pair of window panels, each with a 90° wrap-round, which are the mirror images of each other for adhesive glazing so as to abut on the centre line at the front of a helicopter. These panels would then extend right around the front windscreen area of the helicopter.

The window panel has a lightweight laminated construction and comprises an outer toughened glass ply 1 which is about 3 mm thick and has a conventional electrical heating film 2 on its inner face for de-icing and de-misting. An inner toughened glass ply 3 of the laminate is about 2 mm thick. The outer glass ply may be either thermally or chemically toughened. The inner ply 3 may be annealed, or thermally or chemically toughened.

The inner and outer glass plies are of comparable thickness, each being in the range of glass thicknesses from about 1.5 mm to about 3.5 mm. It is preferred that the thickness of the inner glass ply 3 shall differ from the thickness of the outer glass ply 1 by no more than about 1 mm and preferably the thickness of the inner and outer glass plies 1 and 3 is in the range of nominal glass thickness from about 2 mm to about 3 mm. A thicker outer glass ply 1, for example a nominal glass thickness of about 3 mm, improves resistance to stone damage, hailstones and handling damage.

The outer and inner glass plies 1 and 3 are laminated with an intermediate ply 4 of impact-resistant plastics material about 1 mm thick which is adhered to the glass plies 1 and 3 by interlayers 5 and 6 of transparent plastics material. These interlayers 5 and 6 may be interlayers of polyurethane of thickness in the range 0.375 mm to 2.5 mm and in the embodiment illustrated are interlayers 0.75 mm thick of thermoplastic polyurethane PE192 available from K. J. Quinn Inc. of Malden, Mass., United States of America.

An inner ply 7 of impact-resistant plastics material, which is about 1 mm thick and which serves as an anti-spall layer and contributes to the impact performance of the window panel, is bonded to the rearward face of the inner glass ply 3 by an interlayer 8 which is 0.75 mm thick and is of the same thermoplastic polyurethane as the interlayers 5 and 6. The ply 7 carries an abrasion-resistant coating 9 which is a coating of self-healing polyurethane 0.25 mm thick. This coating 9 acts as a scratch-resistant layer and the polyurethane may be of the kind described in GB No. 2011836 A or GB 2070045 A.

The plastics materials of the impact-resistant intermediate ply 4 and inner ply 7 has a high impact-resistance which provides the main resistance to bird impact. One suitable material for the impact-resistant plies is a polycarbonate made by General Electric which has a high impact strength and weight ratio.

The aggregate thickness of the polycarbonate plies 4 and 7 shall not be less than about 1 mm and is in the range from about 1 mm to about 7.5 mm. Preferably, each of the impact-resistant plies has a thickness of at least 0.5 mm. For weight-sav it is preferred that the aggregate thickness of the polycarbonate plies 4 and 7 is not more than about 3 mm. The particular thickness is chosen in accordance with the desired bird-impact performance required from the window panel.

Figure 2:
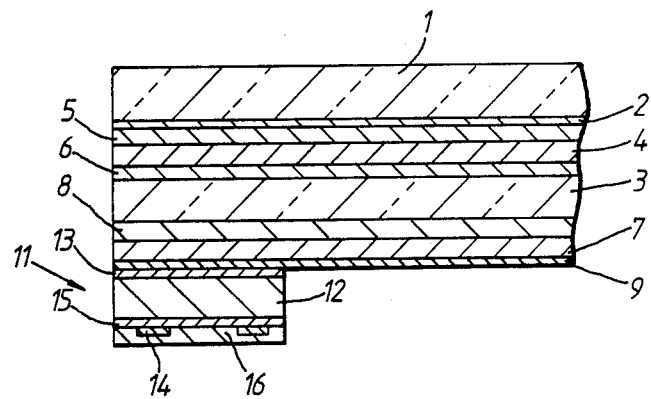
FIG. 2 is a section on line II—II of FIG. 1 showing the construction of the laminated window panel with its peripheral adhesive band for adhesive glazing to the airframe.

The laminated window pane, when viewed in cross-section as illustrated in FIG. 2 has a near "symmetrical" construction so that despite the varying curvature and the 90° wrap-round, problems due to differential expansion coefficients which could produce shape mismatches and thermal stresses during temperature variations are overcome. Because of the "symmetrical" construction of the laminate, thermoplastic adhesives, for example thermoplastic polyurethanes may be used and bonded at elevation temperatures without distorting the shape of the glass plies. This gives a major advantage in that the window panels of the invention can be manufactured by conventional autoclave laminating techniques in which the integers are first formed with compatible curvature, and then assembled with the interlayers for conventional autoclaving, without lamination and shape problems.

For adhesive glazing to the aircraft frame the window panel has a peripheral band, indicated generally as 11 which is adhered to the concave periphery of the rearward face of the curved panel. The band 11 has an adhesive face for adhesion to a window frame having matching curvature.

This peripheral adhesive band comprises a spacer strip 12 of thermosetting polyurethane one face of which is adhered to the rearward face of the laminated panel, in effect to the coating 9, by a bonding strip 13 of thermoplastic polyurethane. An electrical heating element 14 is adhered to the outer face of the strip 12 by a bonding strip 15 of the same thermoplastic polyurethane.

A third strip 16, for example about 1 mm thick, of a thermoplastic polyurethane of lower softening temperature than the polyurethane of the bonding strips 13 and 15 is bonded to the strip 15 and over the heating element which is in effect embedded in the strip 16. This strip 16 is an adhesive strip for adhesion to the airframe. In manufacture a temporary protection layer may be applied on the face of the adhesive strip 16. Such a peripheral band is described in GB No. 2157754 A.

When a window panel is being glazed to an aircraft, the protective layer would be removed, the panel placed in position, and current then supplied to the heating element 14 which softens the adhesive strip 16 preferentially. The spacer strip 12 provides a cushioning effect which ensures uniform contact of the adhesive band when uniform positive pressure is applied to the outside of the window panel during fitting. This pressure is maintained after the heating current has been switched off and the strip has stiffened sufficiently for the required adhesion of the window panel to the airframe.

When a damaged window panel has to be removed the heating current is switched on and the damaged panel can then be pushed out.

By using outer and inner glass plies of comparable thickness (3 mm and 2 mm, respectively) in the range of thickness from about 1.5 mm to about 3.5 mm, with a thin (1 mm) inner ply of impact-resistant plastics to maintain, as far as practical, a symmetrical structure, a dimensionally stable light weight window panel with good impact resistance is provided. This structure is capable of withstanding the differential expansion and contraction which occurs within the laminate over a very wide range of manufacturing and service temperatures, i.e., from −40° C. to 90° C., without delamination or unacceptable stress on the adhesive bonding of the window panel to the airframe.

The window panel of the specific embodiment illustrated in FIGS. 1 and 2 was stable over the service temperature range from −40° C. to +90° C. and resisted bird impact of a 1.8 kg bird at 150 knots (77 m/s) at −20° C. to +50° C. without failure of the polycarbonate plies 4 and 7.

Either or both of the impact-resistant intermediate ply 4 and the anti-spall ply 7 could be of acrylic material although polycarbonate is preferred.

Other adhesives which could be used for the elastomeric interlayers 5, 6 and 8 include silicones and polyvinyl butyral plasticised with a plasticizer compatible with the impact-resistant plastics.

The construction of the lightweight impact-resistant window panels of the invention for adhesive glazing to the airframe of an unpressurised aircraft ensures thermal stability and acceptable thermal stresses over a wide temperature range as met in service, bird impact resistance and good durability even on window panels of large surface area and high curvature for use in helicopters or other unpressurised aircraft where a wide field of observation is required, without detriment to the adhesive glazing of the window panel to the aircraft frame.

Instead of providing the peripheral band 11 for glazing of the window panel to the airframe, the window panel may be bonded to the frame by a resin system which cures in situ, or be secured in position by a retaining ring.

While the invention has been particularly described with reference to a window panel for use in an unpressurised aircraft, it will be appreciated that it may also be useful in other applications, e.g., in motor vehicles, when a high performance lightweight impact-resistant window panel is required.

It will be appreciated that the present invention can be embodied in other specific forms without departing from the spirit or essential characteristics thereof. The presently disclosed embodiments are therefor considered in all respects to be illustrative and not restrictive. The scope of the invention is indicated by the appended claims rather than the foregoing description, and all changes that come within the meaning and range of equivalents thereof are intended to be embraced therein.

We claim:

1. A lightweight impact-resistant window panel comprising an outer toughened glass ply and an inner glass ply each having a thickness in the range from about 1.5 mm to about 3.5 mm and being laminated with an intermediate ply of impact-resistant plastics material which is adhered to the glass plies by transparent plastics interlayers, and an inner ply of impact-resistant plastics material bonded to the rearward face of the inner glass ply by an interlayer of transparent plastics material, the said two plies of impact-resistant plastics material having an aggregate thickness in the range from about 1 mm to about 3 mm.

2. A window panel as claimed in claim 1, wherein the thickness of the inner glass ply differs from the thickness of the outer glass ply by no more than about 1 mm.

3. A window panel as claimed in claim 1, wherein the thickness of the inner and outer glass plies is in the range of nominal glass thickness from about 2 mm to about 3 mm.

4. A window panel as claimed in claim 1, wherein the impact-resistant plies are of polycarbonate.

5. A window panel as claimed in claim 1 or claim 4, wherein said inner impact-resistant ply is about 2 mm thick or less, and said intermediate impact-resistant ply is as thick as, or thicker than said inner impact-resistant ply.

6. A window panel as claimed in claim 1, wherein the transparent plastics interlayers are of polyurethane of thickness in the range from 0.375 mm to 2.5 mm.

7. A window panel as claimed in claim 1 wherein the inner ply of impact-resistant plastics material carries an abrasion-resistant coating of self-healing polyurethane on its exposed face.

8. A lightweight impact-resistant window panel for adhesive glazing to the airframe of an unpressurised aircraft, comprising:
    an outer toughened glass ply of thickness from about 1.5 mm to about 3.5 mm;
    an intermediate ply of impact-resistant plastics material adhered to said outer glass ply by a first transparent plastics interlayer;
    an inner glass ply of thickness from about 1.5 mm to about 3.5 mm adhered to said intermediate ply by a second transparent plastics interlayer; and
    an inner ply of impact-resistant plastics material bonded to the rearward face of said inner glass ply by a third transparent plastics interlayer;
    said intermediate and inner plies of impact-resistant plastics material having an aggregate thickness in the range from about 1 mm to about 3 mm.

9. A window panel as claimed in claim 8, in combination with a peripheral band adhered to the periphery of the rearward face of the panel, which band has an adhesive face for adhesion to a window frame having matching shape.

10. A window panel as claimed in claim 9, wherein the peripheral band comprises a spacer strip of thermosetting polyurethane one face of which is adhered to the rearward face of the window panel, an electrical heating element adhered to the outer face of said spacer strip, and an adhesive strip of thermoplastic polyurethane over said heating element for adhesion to an airframe.

11. A lightweight impact-resistant window panel comprising an outer toughened glass ply and an inner glass ply each having a thickness in the range from about 1.5 mm to about 3.5 mm, the thickness of the inner glass ply differing from the thickness of the outer glass ply by no more than about 1 mm, and being laminated with an intermediate ply of polycarbonate which is adhered to the glass plies by transparent plastics interlayers, and an inner ply of polycarbonate having a thickness up to about 2 mm bonded to the rearward face of the inner glass ply by an interlayer of transparent plastics material, the said two plies of polycarbonate having an aggregate thickness in the range from about 1 mm to about 3 mm.

12. A window panel as claimed in claim 11, wherein the intermediate ply of polycarbonate is at least as thick as, or thicker than, the inner ply of polycarbonate.

13. A window panel as claimed in claim 11, wherein the thickness of the inner ply of polycarbonate does not exceed about 1 mm.

14. A window panel as claimed in claim 13, wherein the intermediate ply of polycarbonate is at least as thick as, or thicker than, the inner ply of polycarbonate.

15. A window panel as claimed in claim 11, in combination with a peripheral band adhered to the periphery of the rearward face of the panel, which band has an adhesive face for adhesion to a window frame having matching shape.

* * * * *